Patented Sept. 18, 1934

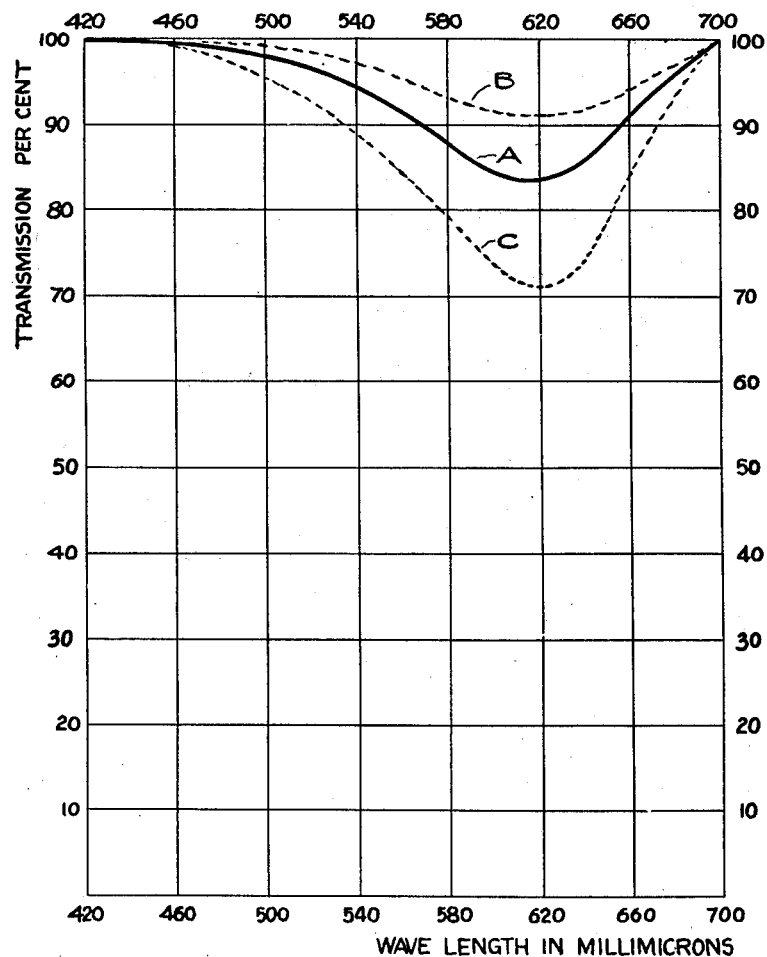

1,973,886

UNITED STATES PATENT OFFICE 1,973,886

X-RAY FILM

George A. Scanlan, Maplewood, and Charles Holzwarth, Parlin, N. J.

Application May 11, 1933, Serial No. 670,540

27 Claims. (Cl. 95—9)

This invention relates to radiography, and more particularly to an improved X-ray film.

One object of this invention is to provide a film base of limited light transmission that will improve the clarity of radiographs taken thereon. Another object is to produce such a base without materially decreasing its ability to transmit light. A further object is to produce such a film base that will permit the transmission of light in those portions of the spectrum that will improve the contrast and clarity of the radiograph. Other more specific objects will more plainly appear from the detailed description presented herein.

Finished X-ray pictures or radiographs are generally viewed for the purpose of diagnosis by means of an illuminated viewing box or screen. These viewing devices usually comprise a bluish or yellowish light source placed behind a bluish or white ground glass. The finished radiographs are attached to and held flat against the opposite side of this ground glass, where they may be examined by transmitted light. The purpose of the blue present in these devices has been to tend to neutralize the yellowish tinge inherent in finished radiographs, as well as to neutralize any content of yellow light that is usually present in the various light sources in general use.

It is well known that the accurate diagnosis of complex radiographs such as those of sinus areas or lung areas is a difficult procedure, even under the most favorable conditions, and consequently the manufacturers of film base have long sought to improve the clarity of the radiograph but heretofore they have always pursued this problem by producing a film base that approached as nearly as it could possibly be made to a clear colorless transparent film.

In the course of their research applicants proved that while clarity of film base was obviously desirable, diagnosis could be greatly aided by also improving the clarity and contrast of the radiograph image itself. Some progress toward this end was made by increasing certain contrast characteristics of the sensitized emulsion or by adding magnifying means to the viewing devices, but the greatest advance in the improvement of the radiograph image was made by applicants in taking a course entirely contrary to prior art research. Instead of following prior art in attempting to further improve the colorless characteristics of X-ray film base, applicants finally demonstrated that the clarity and contrast of the finished radiograph image could be improved not by taking color away from the film base but by adding certain hereindescribed tints of limited light transmission to the base in order to more strongly build up the detail of the faint shadowlike areas of the more complex radiographs when viewed in any of the devices previously described.

In the past various tints of relatively higher density have been incorporated in cinema and studio film for the purpose of producing purely artistic effects in color on the cinema screen or in a finished transparent portrait. Tints of material density are also well known in cinema film base for the purpose of overcoming halation, but prior to applicants' present invention the art never considered the entirely unorthodox limitation of light transmission in X-ray film where no problems of halation are present and where there can be no reason for providing purely artistic effects.

Modern commercial X-ray film usually consists of a support of cellulose nitrate or of cellulose acetate film base, having a gelatinous substrating solution applied to both sides thereof, and a suitable gelatino silver halide emulsion applied over each of these sub-stratum layers. A third type of improved X-ray film base is described in co-pending Holzwarth application now U. S. Patent No. 1,947,160 wherein is set forth an improved safety X-ray film base comprising a cellulose acetate support that is first thoroughly dried in order to completely remove all excess residual solvents and then coated on both sides with a relatively thin layer of cellulose nitrate, to which the usual sub-strating solution and emulsion are applied.

In determining specifications of proper limited transmission tints suitable for use in applicants' improved X-ray film base, it was necessary to incorporate dyes that would co-act with the grain characteristics of the radiograph and with the average light characteristics of the various viewing devices in such a manner that the delicate shadow areas of complex radiographs would be adequately built up by the tint without being obliterated or diminished in clarity.

A limited transmission tint chosen from the blue region of the spectrum was found preferable, and in the drawing, Figure 1 sets forth, in light transmission curve A, the characteristics of a preferred tint which has approximately 100% light transmission in the violet region of the spectrum up to approximately 440 millimicrons that decreases to about 85% transmission at approximately 620 millimicrons and increases again to approximately 100% in the red region of the spectrum.

Desirable results may also be obtained by varying the tint within the approximate limits as shown in Figure 1 by transmission curves B and C, transmission curve C indicating a low transmission point of about 70% at approximately 620 millimicrons and the tint represented by curve B indicating a low transmission point of approximately 92% at about 620 millimicrons. It has been demonstrated that X-ray film base containing a tint within the approximate limits just described imparts to finished radiographs an extremely beneficial and entirely unexpected clarity and detail, particularly to the indistinct regions of complex radiographs such as those taken of sinus and lung areas. Various dye combinations may be devised to produce tints that will impart to X-ray film the hereindescribed limited light transmission, but by way of example the following preferred formulae are recommended for exemplary embodiments of applicants' invention:

*Example 1*

To produce a tint having the approximate characteristics set forth by transmission curve A, a dye solution, consisting of approximately 8.18 grams of Basic Pure blue E and approximately .91 gram of Fuchsine, dissolved in approximately 100 pounds of a mixture of well known solvents such as acetone, cellosolve and ethyl alcohol, is evenly applied to the film by immersion. The quantity of dye applied to the film is approximately 2.07 grams of Basic Pure blue E and approximately .225 gram of Fuchsine per 1000 square feet of finished film.

*Example 2*

To produce a tint having the approximate characteristics set forth by transmission curve B, the dye described in Example 1 is applied so that the X-ray film base will contain approximately .104 gram of Basic Pure blue E and approximately .12 gram of Fuchsine per 1000 square feet of finished film.

*Example 3*

To produce a tint having the approximate characteristics set forth by transmission curve C, the dye described in Example 1 is applied so that the X-ray film base will contain approximately 4.2 grams of Basic Pure blue E and approximately .45 gram of Fuchsine per 1000 square feet of finished film.

Other well known equivalent dyes may be used in place of those herein described. For example, in place of Basic Pure blue E one may use Acrinol blue or Victoria blue BX., and for Fuchsine, other dyes such as Rose Bengal, Methyl violet or Acid Fast violet may also be used. The index numbers of these dyes are as follows:

| Dye | | | |
|---|---|---|---|
| Basic Pure blue E | Color Index Number | | 910 |
| Acrinol blue | do | do | 664 |
| Fuchsine | Schultz | do | 512 |
| Victoria blue BX | do | do | 559 |
| Rose Bengal | do | do | 597 |
| Methyl violet | do | do | 515 |
| Acid Fast violet | do | do | 551 |

These examples of limited transmission tints may be applied by various other known methods, or means, such as incorporation directly in the cellulose base, incorporation in the sub-strating solution or by direct application to the film or base by means of a beading roller, as long as the herein described approximate ratio and concentration of the various dyes are followed.

*Example 4*

In applying the present invention to the improved cockle-proof acetate X-ray film base described in copending Holzwarth application now U. S. Patent No. 1,947,160, a preferred embodiment to incorporate, for example, the herein described limited transmission tints in the course of the manufacture of the film in the following manner:

A freshly solidified solution of the usual cellulose acetate film base dope is first thoroughly dried by subjecting it to an approximate temperature of 108° F. in an atmosphere having a dew point of approximately 53° F., for approximately two hours. A relatively thin sealing layer of cellulose nitrate is then applied to both sides of said thoroughly dried acetate base, in the manner described in said patent, but in the present instance, the cellulose nitrate layers contain a tint that will impart to the finished X-ray film the limited light transmission characteristics approximately set forth by one of the light transmission curves shown in Figure 1. For instance, if the transmission characteristics shown by curve A are desired, approximately 1.63 grams of Basic Pure blue E and .18 gram of Fuchsine dye is incorporated in each of the above described nitrate cockle-proofing sealing layers. The quantity of dye applied is 2.07 grams of Basic Pure blue E and .225 gram of Fuchsine per 1000 square feet of finished film. The usual gelatinous substrating solution is then applied to both sides of the thus sealed acetate base, after which it is subsequently re-dried. It is then led through the usual coating unit which applies and dries a sensitized gelatino-silver-halide emulsion onto both sides of the improved cockle-proof X-ray film base referred to herein.

To produce this cockle-proof X-ray film so that it will embody a tint having the approximate characteristics set forth by transmission curve B, the dye described in Example 4 may be incorporated so that the base will contain approximately .104 gram of Basic Pure blue E and approximately .12 gram of Fuchsine per 1000 square feet of finished film.

If it is desired to produce this cockle-proof X-ray film embodying a tint having the approximate characteristics set forth by transmission curve C, the dye described in Example 4 may be incorporated so that the X-ray film will contain approximately 4.2 grams of Basic Pure blue E and approximately .45 gram of Fuchsine per 1000 square feet of finished film.

Other methods or means may be used to apply these examples of limited transmission units to this improved cockle-proof X-ray film, such as incorporating the dye directly in the cellulose acetate base or in the sub-stratum layers as previously described herein, as long as the herein described approximate ratio and concentration of the various dyes are followed.

The various examples of dyes described herein are unaffected by the various development and processing baths used in X-ray laboratories, and impart a permanent tint to the X-ray film base and to the finished X-ray radiographs.

While applicants have herein described their improved X-ray film, in detail and with respect to preferred embodiment thereof, they do not contemplate limitation thereto but do include all forms and modifications within the language and scope of the appended claims.

We claim:

1. An X-ray sensitive element for intensifying and clarifying the detail of the finished radiograph comprising an emulsion layer suitably sensitive to X-rays, and a transparent support for said emulsion layer, said element having added thereto a permanent tint having enough light limitation to be perceptible in said radiograph as an over-all hue when viewed by the unskilled eye by transmitted white light, said added tint having a light transmission curve with a preponderant transmission of the light in the short wave-length area of the visible spectrum, and a maximum light-limitation that is substantial and in the long wave-length area of the visible spectrum.

2. An X-ray sensitive element for intensifying and clarifying the detail of the finished radiograph comprising an emulsion layer suitably sensitive to X-rays, and a transparent support for said emulsion layer, said element having added thereto a permanent tint having enough light limitation to be perceptible in said radiograph as an over-all hue when viewed by the unskilled eye by transmitted white light, said added tint having a light transmission curve with a preponderant transmission of light of 400 to approximately 560 millimicrons in wave length, and a maximum light-limitation that is substantial and approximately within the wave length range of 560 to 720 millimicrons.

3. An X-ray sensitive element for intensifying and clarifying the detail of the finished radiograph comprising an emulsion layer suitably sensitive to X-rays, and a transparent support for said emulsion layer, said element having added thereto a permanent tint having enough light-limitation to be perceptible in said radiograph as an over-all hue when viewed by the unskilled eye by transmitted white light, said added tint having a light transmission curve with a preponderant transmission of the light in the short wave-length area of the visible spectrum, and a maximum light-limitation that is substantial and in the long wave-length area of the visible spectrum, at least a portion of said curve in said long wave-length area of the visible spectrum having a light transmission of approximately 70% to approximately 90%.

4. An X-ray sensitive element for intensifying and clarifying the detail of the finished radiograph comprising an emulsion layer suitably sensitive to X-rays, and a transparent support for said emulsion layer, said element having added thereto a permanent tint having enough light-limitation to be perceptible in said radiograph as an over-all hue when viewed by the unskilled eye by transmitted white light, said added tint having a light transmission curve with a preponderant transmission of the light in the bluish portions of the visible spectrum, and a maximum light-limitation that is substantial and in the long wave-length area of the visible spectrum.

5. An X-ray sensitive element for intensifying and clarifying the detail of the finished radiograph comprising an emulsion layer suitably sensitive to X-rays, and a transparent support for said emulsion layer, said element having added thereto a permanent tint having enough light-limitation to be perceptible in said radiograph as an over-all hue when viewed by the unskilled eye by transmitted white light, said added tint having a light transmission curve with a preponderant transmission of the light in the blue region of the visible spectrum, and a maximum light-limitation that is substantial and in the long wave-length area of the visible spectrum, at approximately 600 to approximately 640 millimicrons.

6. A finished X-ray film comprising a developed radiograph and a transparent support therefor, said film having added thereto a permanent tint having enough light-limitation to be perceptible in said radiograph as an over-all hue when viewed by the unskilled eye by transmitted white light, said added tint having a light transmission curve with a preponderant transmission of the light in the short wave-length area of the visible spectrum, and a maximum light-limitation that is substantial and in the long wave-length area of the visible spectrum.

7. A finished X-ray film comprising a developed radiograph and a transparent support therefor, said film having added thereto a permanent tint having enough light-limitation to be perceptible in said radiograph as an over-all hue when viewed by the unskilled eye by transmitted white light, said added tint having a light transmission curve with a preponderant transmission of the light of 400 to approximately 560 millimicrons in wave length, and a maximum light-limitation that is substantial and approximately within the wave length range of 560 to 720 millimicrons.

8. A finished X-ray film comprising a developed radiograph and a transparent support therefor, said film having added thereto a permanent tint having enough light-limitation to be perceptible in said radiograph as an over-all hue when viewed by the unskilled eye by transmitted white light, said added tint having a light transmission curve with a preponderant transmission of the light in the short wave-length area of the visible spectrum, and a maximum light-limitation that is substantial and in the long wave-length area of the visible spectrum, at least a portion of said curve in said long wave-length area of the visible spectrum having a light transmission of approximately 70% to approximately 90%.

9. A finished X-ray film comprising a developed radiograph and a transparent support therefor, said film having added thereto a permanent tint having enough light-limitation to be perceptible in said radiograph as an over-all hue when viewed by the unskilled eye by transmitted white light, said added tint having a light transmission curve with a preponderant transmission of the light in the bluish portions of the visible spectrum, and a maximum light-limitation that is substantial are in the long wave-length area of the visible spectrum.

10. A finished X-ray film comprising a developed radiograph and a transparent support therefor, said film having added thereto a permanent tint having enough light-limitation to be perceptible in said radiograph as an over-all hue when viewed by the unskilled eye by transmitted white light, said added tint having a light transmission curve with a preponderant transmission of the light in the blue region of the visible spectrum, and a maximum light-limitation that is substantial and in the long wave-length area of the visible spectrum, at approximately 600 to approximately 640 millimicrons.

11. An X-ray sensitive element for intensifying and clarifying the detail of the finished radiograph comprising a transparent cellulose acetate film base having a relatively thin coating of cellulose nitrate on each side thereof, and an emulsion layer suitably sensitive to X-rays, said element having added thereto a permanent tint having enough light-limitation to be perceptible in said radiograph as an over-all hue when viewed by the unskilled eye by transmitted white light, said added tint having a light transmission curve with a preponderant transmission of the light in the short wave-length area of the visible spectrum, and a maximum light-limitation that is substantial and in the long wave-length area of the visible spectrum.

12. An X-ray sensitive element for intensifying and clarifying the detail of the finished radiograph comprising a transparent cellulose acetate film base having a relatively thin coating of cellulose nitrate on each side thereof, and an emulsion layer suitably sensitive to X-rays, said element having added thereto a permanent tint having enough light-limitation to be perceptible in said radiograph as an over-all hue when viewed by the unskilled eye by transmitted white light, said added tint having a light transmission curve with a preponderant transmission of the light of 400 to approximately 560 millimicrons in wave length, and a maximum light-limitation that is substantial and approximately within the wave length range of 560 to 720 millimicrons.

13. An X-ray sensitive element for intensifying and clarifying the detail of the finished radiograph comprising a transparent cellulose acetate film base having a relatively thin coating of cellulose nitrate on each side thereof, and an emulsion layer suitably sensitive to X-rays, said element having added thereto a permanent tint having enough light-limitation to be perceptible in said radiograph as an over-all hue when viewed by the unskilled eye by transmitted white light, said added tint having a light transmission curve with a preponderant transmission of the light in the short wave-length area of the visible spectrum, and a maximum light-limitation that is substantial and in the long wave-length area of the visible spectrum, at least a portion of said curve in said long wave-length area of the visible spectrum having a light transmission of approximately 70% to approximately 90%.

14. An X-ray sensitive element for intensifying and clarifying the detail of the finished radiograph comprising a transparent cellulose acetate film base having a relatively thin coating of cellulose nitrate on each side thereof, and an emulsion layer suitably sensitive to X-rays, said element having added thereto a permanent tint having enough light-limitation to be perceptible in said radiograph as an over-all hue when viewed by the unskilled eye by transmitted white light, said added tint having a light transmission curve with a preponderant transmission of the light in the bluish portions of the visible spectrum, and a maximum light-limitation that is substantial and in the long wave-length area of the visible spectrum.

15. An X-ray sensitive element for intensifying and clarifying the detail of the finished radiograph comprising a transparent cellulose acetate film base having a relatively thin coating of cellulose nitrate on each side thereof, and an emulsion layer suitably sensitive to X-rays, said element having added thereto a permanent tint having enough light-limitation to be perceptible in said radiograph as an over-all hue when viewed by the unskilled eye by transmitted white light, said added tint having a light transmission curve with a preponderant transmission of the light in the blue region of the visible spectrum, and a maximum light-limitation that is substantial and in the long wave-length area of the visible spectrum, at approximately 600 to approximately 640 millimicrons.

16. A finished X-ray film comprising a developed radiograph and a transparent cellulose acetate support therefor having a relatively thin coating of cellulose nitrate on each side thereof, said film having added thereto a permanent tint having enough light-limitation to be perceptible in said radiograph as an over-all hue when viewed by the unskilled eye by transmitted white light, said added tint having a light transmission curve with a preponderant transmission of the light in the short wave-length area of the visible spectrum, and a maximum light-limitation that is substantial and in the long wave-length area of the visible spectrum.

17. A finished X-ray film comprising a developed radiograph and transparent cellulose acetate support therefor having a relatively thin coating of cellulose nitrate on each side thereof, said film having added thereto a permanent tint having enough light-limitation to be perciptible in said radiograph as an over-all hue when viewed by the unskilled eye by transmitted white light, said added tint having a light transmission curve with a preponderant transmission of the light of 400 to approximately 560 millimicrons in wave length, and a maximum light-limitation that is substantial and approximately within the wave length range of 560 to 729 millimicrons.

18. A finished X-ray film comprising a developed radiograph and a transparent cellulose acetate support therefor having a relatively thin coating of cellulose nitrate on each side thereof, said film having added thereto a permanent tint having enough light-limitation to be perceptible in said radiograph as an over-all hue when viewed by the unskilled eye by transmitted white light, said added tint having a light transmission curve with a preponderant transmission of the light in the short wave-length area of the visible spectrum, and a maximum light-limitation that is substantial and in the long wave-length area of the visible spectrum, at least a portion of said curve in said long wave-length area of the visible spectrum having a light transmission of approximately 70% to approximately 90%.

19. A finished X-ray film comprising a developed radiograph and a transparent cellulose acetate support therefor having a relatively thin coating of cellulose nitrate on each side thereof, said film having added thereto a permanent tint having enough light-limitation to be perceptible in said radiograph as an over-all hue when viewed by the unskilled eye by transmitted white light, said added tint having a light transmission curve with a preponderant transmission of the light in the bluish portions of the visible spectrum, and a maximum light-limitation that is substantial and in the long wave-length area of the visible spectrum.

20. A finished X-ray film comprising a developed radiograph and a transparent cellulose acetate support therefor having a relatively thin coating of cellulose nitrate on each side thereof, said film having added thereto a permanent tint having enough light-limi tion to be perceptible in said radiograph as an over-all hue when viewed by the unskilled eye by transmitted white light, said added tint having a light transmission curve with a preponderant transmission of the light in the blue region of the visible spectrum, and a maximum light-limitation that is substantial and in the long wave-length area of the visible spectrum, at approximately 600 to approximately 640 millimicrons.

21. An X-ray sensitive element for intensifying and clarifying the detail of the finished radiograph comprising an emulsion layer suitably sensitive to X-rays, and a transparent support for said emulsion layer, said element having added thereto a tint unaffected by processing treatments and having enough light-limitation to be perceptible in said radiograph as an over-all hue when viewed by the unskilled eye by transmitted white light, said added tint having a light transmission curve having light transmission of approximately 100% in the visible spectrum up to approximately 440 millimicrons, said transmission decreased to approximately 70% to 90% at approximately 560 to 660 millimicrons, and increasing to approximately 100% at approximately 700 millimicrons.

22. An X-ray sensitive element for intensifying and clarifying the detail of the finished radiograph comprising an emulsion layer suitably sensitive to X-rays, and a transparent support for said emulsion layer, said element having added thereto a tint unaffected by processing treatments and having enough light-limitation to be perceptible in said radiograph as an over-all hue when viewed by the unskilled eye by transmitted white light, said added tint corresponding to that obtained by adding approximately three grams of tinting dye per 1000 square feet of the area of said element, said tinting dye being composed principally of Victoria blue BX.

23. An X-ray sensitive element for intensifying and clarifying the detail of the finished radiograph comprising an emulsion layer suitably sensitive to X-rays, and a transparent support for said emulsion layer, said element having added thereto a tint unaffected by processing treatments and having enough light-limitation to be perceptible in said radiograph as an over-all hue when viewed by the unskilled eye by transmitted white light, said tint corresponding to that obtained by adding approximately three grams of tinting dye per 1000 square feet of the area of said element, said tinting dye being composed of Victoria blue BX and Fuchsine in the approximate ratio of 8 to 1.

24. An X-ray sensitive element for intensifying and clarifying the detail of the finished radiograph comprising an emulsion layer suitably sensitive to X-rays, and a transparent support for said emulsion layer, said support having added thereto a permanent tint having enough light-limitation to be perceptible in said radiograph as an over-all hue when viewed by the unskilled eye by transmitted white light, said added tint having a light transmission curve with a preponderant transmission of light of 400 to approximately 560 millimicrons in wave length, and a maximum light-limitation that is substantial and approximately within the wave length range of 560 to 720 millimicrons.

25. An X-ray sensitive element for intensifying and clarifying the detail of the finished radiograph comprising an emulsion layer suitably sensitive to X-rays, and a transparent support therefor having a sub-stratum applied thereto said sub-stratum having added thereto a permanent tint having enough light-limitation to be perceptible in said radiograph as an over-all hue when viewed by the unskilled eye by transmitted white light, said added tint having a light transmission curve with a preponderant transmission of light of 400 to approximately 560 millimicrons in wave length, and a maximum light-limitation that is substantial and approximately within the wave length range of 560 to 720 millimicrons.

26. An X-ray sensitive element for intensifying and clarifying the detail of the finished radiograph comprising a transparent cellulose acetate film base having a relatively thin coating of cellulose nitrate on each side thereof, and an emulsion layer suitably sensitive to X-rays, said nitrate coating having added thereto a permanent tint having enough light-limitation to be perceptible in said radiograph as an over-all hue when viewed by the unskilled eye by transmitted white light, said added tint having a light transmission curve with a preponderant transmission of the light of 400 to approximately 560 millimicrons in wave length, and a maximum light-limitation that is substantial and approximately within the wave length range of 560 to 720 millimicrons.

27. An X-ray sensitive element for intensifying and clarifying the detail of the finished radiograph comprising an emulsion layer suitably sensitive to X-rays, and a transparent support therefor comprising a cellulose ester film base, said base having added thereto a permanent tint having enough light-limitation to be perceptible in said radiograph as an over-all hue when viewed by the unskilled eye by transmitted white light, said added tint having a light transmission curve with a preponderant transmission of light of 400 to approximately 560 millimicrons in wave length, and a maximum light-limitation that is substantial and approximately within the wave length range of 560 to 720 millimicrons.

GEORGE A. SCANLAN.
CHARLES HOLZWARTH.